United States Patent
Milam et al.

(10) Patent No.: US 10,325,258 B2
(45) Date of Patent: Jun. 18, 2019

(54) SYSTEMS AND METHODS FOR ACCOUNT PROCESSING VALIDATION

(71) Applicant: MasterCard International Incorporated, Purchase, NY (US)

(72) Inventors: Amy Christine Milam, Wentzville, MO (US); Stephen J. Klaus, Clayton, MO (US); Allen Russell Thompson, Florissant, MO (US); Richard G. Ampleman, Florissant, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 90 days.

(21) Appl. No.: 14/316,240

(22) Filed: Jun. 26, 2014

(65) Prior Publication Data
US 2015/0012423 A1   Jan. 8, 2015

Related U.S. Application Data

(60) Provisional application No. 61/842,814, filed on Jul. 3, 2013.

(51) Int. Cl.
*G06Q 20/40* (2012.01)
*G06Q 20/10* (2012.01)

(52) U.S. Cl.
CPC .......... *G06Q 20/40* (2013.01); *G06Q 20/102* (2013.01)

(58) Field of Classification Search
CPC .................... G06Q 20/40; G06Q 20/0102
See application file for complete search history.

(56) References Cited

U.S. PATENT DOCUMENTS

| | | | | |
|---|---|---|---|---|
| 5,465,206 A | * | 11/1995 | Hilt | G06Q 20/02 705/40 |
| 5,884,288 A | * | 3/1999 | Chang | G06Q 20/04 235/379 |
| 5,920,847 A | * | 7/1999 | Kolling | G06Q 20/02 705/40 |
| 6,438,527 B1 | * | 8/2002 | Powar | G06Q 20/02 705/40 |
| 7,175,074 B2 | * | 2/2007 | Mejias | G06Q 20/042 235/379 |
| 7,917,435 B2 | | 3/2011 | Hall et al. | |

(Continued)

OTHER PUBLICATIONS

Virtual Hosting. Wikimedia Foundation, Apr. 4, 2013. Web. Aug. 22, 2016 <https://en.wikipedia.org/w/index.php?title=Virtual_hosting &oldid=548663322>.*

(Continued)

*Primary Examiner* — Kito R Robinson
*Assistant Examiner* — Shacole C Tibljas
(74) *Attorney, Agent, or Firm* — Armstrong Teasdale LLP

(57) ABSTRACT

A computer system for validating an account to be used in an electronic payment includes a processor coupled to a memory device. The computer system is programmed to receive an account validation web request from a bill payment originator. The account validation web request includes account details. The computer system is further programmed to process the account validation web request to parse the account details, validate the account details associated with the account validation web request using at least one validation rule, and transmit an account validation web response to the bill payment originator.

23 Claims, 7 Drawing Sheets

(56) References Cited

U.S. PATENT DOCUMENTS

| | | | |
|---|---|---|---|
| 8,285,640 B2 | 10/2012 | Scipioni | |
| 9,065,643 B2* | 6/2015 | Hurry | G06Q 20/3829 |
| 2004/0049457 A1 | 3/2004 | Garrison et al. | |
| 2004/0210527 A1 | 10/2004 | Woda et al. | |
| 2005/0125347 A1 | 6/2005 | Akialis et al. | |
| 2005/0222952 A1* | 10/2005 | Garrett | G06Q 20/102 |
| | | | 705/40 |
| 2006/0165060 A1* | 7/2006 | Dua | G06Q 20/20 |
| | | | 370/352 |
| 2009/0037304 A1 | 2/2009 | Matsuda et al. | |
| 2009/0138394 A1 | 5/2009 | Garrison et al. | |
| 2010/0100480 A1 | 4/2010 | Altman et al. | |
| 2013/0018798 A1 | 1/2013 | Scipioni | |
| 2013/0290177 A1 | 10/2013 | Milam et al. | |
| 2013/0311362 A1 | 11/2013 | Milam et al. | |
| 2014/0095385 A1* | 4/2014 | Ainslie | G06Q 20/40 |
| | | | 705/44 |
| 2014/0149289 A1* | 5/2014 | Beighley, Jr. | G06Q 20/102 |
| | | | 705/44 |

OTHER PUBLICATIONS

Virtual Hosting. Wikimedia Foundation, Apr. 4, 2013. Web. Aug. 22, 2016. <https://en.wikipedia.org/w/index.php?title=Virtual_hosting&oldid=548663322> (Year: 2013).*

International Search Report and Written Opinion for related matter PCT/US2014/044555 dated Oct. 16, 2014, 10 pp.

* cited by examiner

SYSTEMS AND METHODS FOR ACCOUNT PROCESSING VALIDATION

CROSS REFERENCE TO RELATED APPLICATIONS

This patent application claims priority to U.S. Provisional Patent Application Ser. No. 61/842,814, filed on Jul. 3, 2013, which is hereby incorporated by reference in its entirety.

BACKGROUND OF THE DISCLOSURE

The field of the disclosure relates generally to systems and methods for electronic bill payment, and more particularly to systems and methods for validating an account to be used in an electronic payment.

Known electronic bill presentment and payment systems enable payors to receive and pay bills electronically through the use of a third-party bill payment originator. Initially, a payor must identify a potential biller/payee to a system run by a third-party originator. Typically, in known systems, the payor identifies a potential payee/biller by name and by a payee zip code. For example, the payor may have a paper bill that the payor desires to pay electronically. Using the payee name and remittance address on the paper bill, the payor identifies the biller/payee to the system. Known systems compare the payee name and zip code to biller/payees that are known to the system (i.e., known "billers"). More particularly, known systems may maintain a database of biller/payees that includes information on how a customer account number associated with each biller/payee should be formatted. In addition, some known bill payment systems use a payment network, such as the MasterCard® Network, to transfer payments from payors to payees (MasterCard is a registered trademark of MasterCard International, of Purchase, N.Y.).

After the payee is matched to a known biller, the payor may receive bills and submit payments electronically through the system. If the payee cannot be matched to a known biller, payment generally cannot be sent electronically and must be sent via paper check. Payments sent non-electronically cause unwanted burdens and delays to users, payment systems, and payees.

In some situations, a payor may supply imperfect biller/payee information to the bill payment originator running the bill payment system. Some known systems may receive imperfect customer account number information, and may cause payments to fail to pass biller payment processing edits. If the customer account number does not pass biller payment processing edits, a reject transaction is generated and provided back to the bill payment originator. For example, if the payor submits a payment to a bill payment originator for a payee/biller with a customer account number of "1234567890" and the associated biller/payee can only process account identifiers which are exactly eleven characters long, the customer account number may be rejected because it does not pass biller payment processing edits. In some systems, bill payment originators perform account validation tasks manually to avoid such rejections.

Accordingly, a system and method for facilitating electronic payments by reducing non-electronic payments is desired. More particularly, a system and method for validating an account to be used in an electronic payment is desired.

BRIEF DESCRIPTION OF THE DISCLOSURE

In one aspect, a computer system for validating an account to be used in an electronic payment is provided. The computer system includes a host computing device. The host computing device includes a processor in communication with a memory device. The host computing device is programmed to receive an account validation web request from a bill payment originator. The account validation web request includes account details. The computer system is further programmed to process the account validation web request to parse the account details, validate the account details associated with the account validation web request using at least one validation rule, and transmit an account validation web response to the bill payment originator.

In another aspect, a computer-based method for validating an account to be used in an electronic payment is provided. The method is implemented by a host computer device including a processor in communication with a memory device. The method includes receiving an account validation web request from a bill payment originator, wherein the account validation web request includes account details, processing the account validation web request to parse the account details, validating the account details associated with the account validation web request using at least one validation rule, and transmitting an account validation web response to the bill payment originator.

In yet another aspect, at least one non-transitory computer-readable storage media having computer-executable instructions embodied thereon is provided. When executed by at least one processor, the computer-executable instructions cause the processor to receive an account validation web request from a bill payment originator, wherein the account validation web request includes account details, process the account validation web request to parse the account details, validate the account details associated with the account validation web request using at least one validation rule, and transmit an account validation web response to the bill payment originator.

BRIEF DESCRIPTION OF THE DRAWINGS

FIG. 1 illustrates an example payment system for processing electronic payments without a customer account validation processor wherein a payment initiated by a payor is rejected by a biller.

FIG. 2 illustrates a second example payment system for processing electronic payments without a customer account validation processor wherein a payment initiated by a payor is successfully processed by a biller.

FIG. 3 illustrates an example payment system for processing electronic payments using a customer account validation processor in accordance with the present disclosure.

FIG. 4 is a flow diagram of an example validation method performed by the customer account validation processor shown in FIG. 3.

FIG. 5 illustrates an example configuration of a server system that may be used to implement the system shown in FIG. 3.

FIG. 6 is a simplified block diagram of an example payment system for use with the system shown in FIG. 3.

FIG. 7 illustrates an example configuration of a database within a computing device, along with other related computing components, that may be used during the customer account validation process.

DETAILED DESCRIPTION OF THE DISCLOSURE

Figure 1:
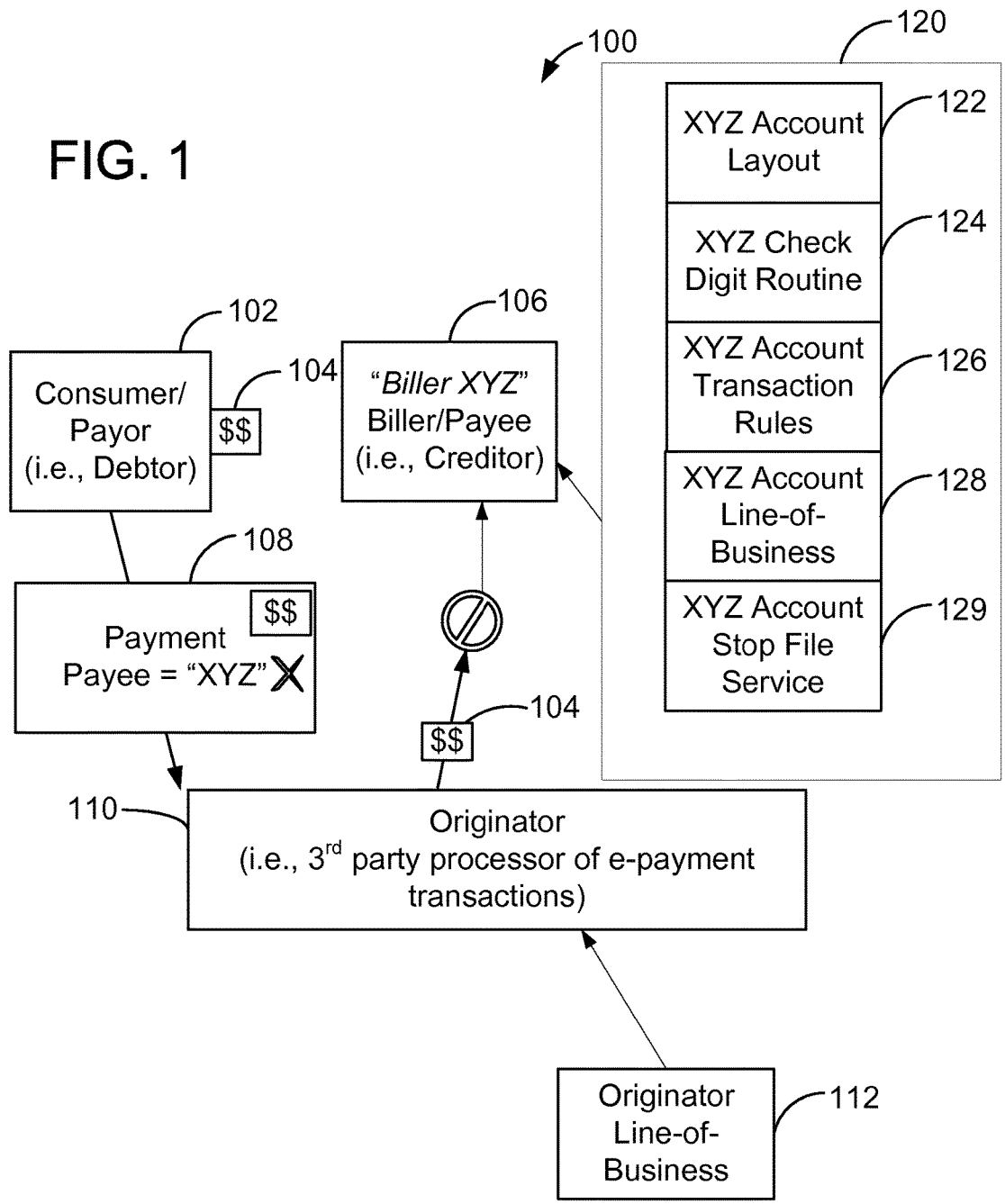
FIGS. 1-7 illustrate example embodiments of the methods and systems described herein.

The methods and systems described herein relate to validating an account used in an electronic payment and refer to the accompanying drawings. The same reference numbers in different drawings may identify the same or similar elements. Also, the following detailed description does not limit the claims.

The subject matter described herein relates generally to validating customer (sometimes referred to as "consumer") account numbers for use in electronic payment methods. Embodiments of the present disclosure facilitate the efficient transfer of money by validating the use of customer account numbers used in electronic payment methods that may be used to replace traditional and less effective payment methods. Such embodiments prevent the need to manually perform such customer account number validation or eliminate the need for systems dedicated to a particular payee/biller.

In many bill presentment and payment systems, an individual customer may pay for a bill using a third-party entity known as a bill payment originator or a bill payment service provider. As used herein, the terms "bill payment originator" and "bill payment service provider" may be used interchangeably. A bill payment originator may be, for example, a banking institution that allows its customers to submit electronic payments or a walk-in payment processing (WIPP) institution that allows customers to make payments to a biller or a payee. As used herein, the terms "biller" and "payee" may be used interchangeably. A biller or payee may be any business, merchant, or other service provider which has a transactional relationship with a customer which necessitates bill payment. The bill payment is typically recurring at a periodic interval (e.g., monthly) but it may occur with any frequency and over any period of time. Although the customer may have multiple methods of providing a bill payment to the biller/payee, the customer may use a bill payment originator to pay the biller/payee.

Additionally, although a customer may wish to use the bill payment originator to pay a biller multiple instances (e.g., for a recurring utility payment), in at least the first instance of using the bill payment originator, the bill payment originator may require the validation of the customer account number used for paying the biller/payee. This may be valuable to the bill payment originator because if the payor provides an invalid customer account number, the bill payment originator is not able to provide payment to the biller/payee. In at least some cases, the customer may not be available after they request to make payment. For example, the customer may be a walk-in customer to a WIPP that pays the originator in cash an amount used to pay the biller/payee and a service fee charged by the originator. Therefore, the bill payment originator may have to search for the customer to obtain the correct customer account number, if the correct customer account number is not used when making the payments.

In the system described herein, a network-based computer system (i.e., a "host") receives an account validation web request from a bill payment originator. The bill payment originator sends the account validation web request upon a request from a payor to use the services of the bill payment originator to make a payment to a biller/payee. The bill payment originator sends the account validation web request from at least one computing device which is in networked communication with the host. The networked communication may include the Internet or any local, regional, global, public, and proprietary network. The account validation web request includes a billing payment originator identifier, a date and time associated with the account validation web request, a biller identifier, and a customer account number. The account validation web request may also include a transaction amount (i.e., the value associated with the payment) and a plurality of customer identifiers. The plurality of customer identifiers may include a variety of identifying information for the customer including customer categories, affiliations, and location information.

Due to potential security concerns, the account validation web request may be transmitted using a security method. For example, the account validation web request may involve the use of digital signatures, virtual security keys, and secure transmission protocols. The account validation web request is received by a web service running on the host. The web service may be a representational state transfer compliant (REST compliant) web service or an arbitrary web service. In the example embodiment, the web service is a web application programming interface (web API) where the account validation web request can be received as a hypertext transfer protocol (HTTP) request. In this example, the account validation web request represents a HTTP request sent to a gateway which can identify the web service used for validation. The account validation web request substantially represents a uniform resource locator (URL) request which may be sent to the web service and include references to information related to the account validation. The HTTP request further includes a reference to the specific web service which can be parsed from the URL. The gateway parses this reference and passes the request to the appropriate validation web service.

Upon receiving the account validation web request, the host processes the account validation web request and parses out account details. The account details are the components of the account validation web request and include at least a billing payment originator identifier, a date and time associated with the account validation web request, a biller identifier, and a customer account number. The account details may also include a transaction amount and the plurality of customer identifiers. The host processes the account validation web request by parsing the URL string received in the HTTP request.

The host validates the account details associated with the account validation web request using at least one validation rule. At least one of the validation rules includes a check digit routine and a biller account mask comparison. Each biller/payee may utilize a distinct validation rule for the check digit routine and the biller account mask comparison. Accordingly, the host retrieves at least one biller account layout associated with the biller/payee associated with the account validation web request. The biller account layout is retrieved from a biller database in communication with the host.

In some cases, a particular payee/biller may not validly accept payments exceeding or falling below payment limits. For example, a particular payee/biller may not ever take payments of over a certain limit for a particular account. If a payor seeks to pay more than this limit, the transaction may not be valid. Accordingly, the host also validates that the account validation web request does not exceed the associated threshold transaction amount.

Additionally, particular bill payment originators may only be associated with a certain category of billers/payees. This category may be referred to as a "line-of-business". The host also validates that the bill payment originator identifier included within the account details is an account identifier which is associated with a line-of-business that includes the biller/payee. The host retrieves a line-of-business associated with the bill payment originator from a bill payment originator database. For example, the host may search in the bill payment originator database for a line-of-business value associated with an identifier for the bill payment originator.

In one example, a bill payment originator is associated with an identifier of "A1B2". Searching the bill payment originator for a line-of-business value associated with "A1B2" returns a line-of-business value of "healthcare". The host conducts a similar search for the biller/payee by determining a biller/payee identifier (e.g., "Payee1") and searching a biller/payee database to identify a line-of-business associated with the identifier, "Payee1." In the example, the biller/payee database includes a value of "healthcare" for the line-of-business associated with "Payee1". The host verifies that the line-of-business value for the bill payment originator correspond to that of the biller/payee. (In this example, the values match successfully.)

The host also transmits an account validation web response to the bill payment originator. The account validation web response is initiated by a web service. In the example embodiment, the account validation web response represents an HTTP request sent to a computing device associated with the bill payment originator. In other words, the web service on the host transmits a response that can be received by the computing device to indicate whether the account validation web request was accepted or rejected. The account validation web response includes a response indicator representing whether the account details were validated or not. The account validation web response also includes an error code and an associated error message if the account details were invalid for the specified biller/payee identification number. The account validation web response may include an "echo" of the plurality of customer identifiers.

Described in detail herein are example embodiments of systems and methods for validating an account to be used in an electronic payment. The systems and methods facilitate, for example, receiving an account validation web request from a bill payment originator wherein the account validation web request includes account details, processing the account validation web request to parse the account details, validating the account details associated with the account validation web request using at least one validation rule, and transmitting an account validation web response to the bill payment originator. A technical effect of the systems and methods described herein include at least one of (a) reducing the incidence of misrouted bill payments; (b) increasing the efficiency of bill payment originator systems; (c) increasing the rate of successful bill payments using bill payment originator systems; and (d) reducing search costs and other overhead associated with misrouted bill payments.

More specifically, the technical effects can be achieved by performing at least one of the following steps: (a) receiving, at a host computing device, an account validation web request from a bill payment originator (i.e., an originator computing device), wherein the account validation web request includes account details; (b) processing the account validation web request to parse the account details; (c) validating, using at least one validation rule, the account details associated with the account validation web request; (d) transmitting an account validation web response to the bill payment originator (i.e., the originator computing device); (e) receiving the account validation web request from at least one computing device, such as the originator computing device, in networked communication with the host computer system; (f) receiving the account validation web request using at least one security method; (g) receiving the account validation web request from the bill payment originator wherein the account validation web request is received as a hypertext transfer protocol (HTTP) request received at a web service; (h) receiving the account validation web request wherein the account validation web request further includes a request to the web service to perform the validation service; (i) receiving the account validation web request at the web service wherein the web service represents a web application program interface (API) substantially representing a gateway; (j) receiving the account validation web request wherein the account details include at least one of a customer identifier associated with the validation web request and a biller, a timestamp identifier associated with the validation web request wherein the timestamp identifier substantially represents a date and time associated with the validation web request, a biller identification number associated with the validation web request and a biller, a consumer account number associated with the validation web request, a transaction value associated with the validation web request, and at least one customer identifier; (k) processing the account validation web request by parsing the URL received by the web service into the account details; (l) retrieving at least one biller account layout associated with a biller associated with the account validation web request from a biller database; (m) retrieving at least one of a check digit routine and a biller account mask comparison associated with a biller associated with the account validation web request from a biller database; (n) validating the account details by using a validation rule including at least one of a check digit routine and a biller account mask comparison; (o) validating the account details by verifying that the transaction value associated with the validation web request does not exceed a threshold transaction value amount; (p) validating the account details by verifying that the customer identifier matches a line-of-business category associated with a biller; (q) transmitting an account validation web response including the at least one customer identifier; (r) transmitting an account validation web response including a response indicator representing whether the account details were validated; (s) transmitting an account validation web response including at least one of an error message and an error code; and (t) transmitting an account validation web response wherein the account validation web response is transmitted as a hypertext transfer protocol (HTTP) response sent by a web service.

In one embodiment, a computer program is provided, and the program is embodied on a computer readable medium, such as a non-transitory computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third-party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, or to a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL®, IBM® DB2, Microsoft® SQL Server, Sybase®, and PostgreSQL. However, any database may be used that enables the systems and methods described herein. (Oracle and MySQL are registered trademarks of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.) As used herein, the term "database system" refers specifically to a RDBMS.

FIG. 1 illustrates an example payment system 100 for processing electronic payments without a customer account validation processor, wherein a payment initiated by a payor is rejected by a biller. In the example embodiment, a payor 102 (i.e., a debtor) owes a payment 104 to a biller 106. Payor 102 may be, for example, a resident of a municipality that owes a payment 104 for residential electricity to a biller 106, the local electric company "Biller XYZ." Payor 102 utilizes online payment of bills through an originator 110. Originator 110 may be, for example, a walk-in payment processing (WIPP) institution or a banking institution that allows its customers to submit electronic payments.

To initiate an electronic payment, payor 102 submits electronic payment 108 to originator 110. For example, payor 102 may provide a cash amount (or other form of acceptable payment) to originator 110 so that originator 110 can electronically pay biller 106 on behalf of payor 102. In the example embodiment, payor 102 wants to target "Biller XYZ" to receive payment 104 using a customer identification number associated with payor 102. Payor 102 includes information in electronic payment 108 that identifies the payee/biller, relates to the transaction itself, and identifies payor 102. For example, payor 102 includes in electronic payment 108 information including a billing payment originator identifier, a date and time associated with the electronic payment 108, a biller identifier, a customer account number, a transaction amount (i.e., the value associated with the payment) and a plurality of customer identifiers. In this example, payor 102 includes in electronic payment 108 the following information:

TABLE 1

| | |
|---|---|
| Billing Payment Originator Number | 1234567890 |
| Date/Time Stamp | Jan. 1, 2013 1:15 AM |
| Biller/Payee Identification Number | 1234 |
| Customer Account Number | 1-2-333-4444 |
| Transaction Amount | $250.00 |
| Customer Identifier | 1234 Anywhere Drive Smalltown, BB |

For a particular biller 106, particular validation rules 120 may apply to electronic payment 108. For example, biller 106 may require that all customer account numbers follow an account layout 122. In this example, biller 106 is associated with biller/payee identification number "1234" and requires XYZ account layout 122. Account layout 122 may also be known as an account mask. An account mask is a regular expression and/or any other mask used to indicate an expected string format, including, but not limited to, a number of digits, placement of alpha characters, etc. In the example embodiment, the regular expression rules include a "#" for all digits "0" to "9", a "*" for any alphabetical character, a "g" for any alpha-numeric character, and a "!" for any combination of alpha-numeric and special characters. For example, a certain biller may always use the template "##-**####", which would match an example account number such as "76-MD5432", but would not match another example account number such as "7M-6D5432" or "76M-D5432".

In the example embodiment, XYZ account layout 122 may specify that a customer account number be a ten-digit number with a single-digit first section, a double-digit second section, a triple-digit third section, and a quadruple-digit fourth section. In other words, XYZ account layout requires that all customer account numbers have a layout of "#-##-###-####". Note that the customer account number (listed in Table 1 as "1-2-333-4444") in the example does not adhere to this layout as it has a format of "#-#-###-####" because the second section is only a single-digit. Accordingly, in this example, the customer account number does not satisfy the validation rules associated with biller 106.

In known systems involving processing of electronic payments, the originator 110 may attempt to send payment 104 despite the discrepancy between the customer account number and the XYZ account layout 122. Because of the discrepancy in electronic payment 108, payment 104 cannot be processed, and a direct mail check may be required.

A particular biller 106 may also require a check digit routine 124 to be run on a customer account number. The check digit routine may be any algorithm used to verify the authenticity, internal consistency, redundancy, and/or integrity of the payee consumer account number. The check digit routine may be any known or suitable check digit routine commonly used for error detection. For example, some credit card providers use the MOD 10, "Luhn", algorithm as a checksum on the digits in a credit card number. Check digit routines 124 may be beneficial to reduce risks of account fraud and misdirected payment. As in the case of account layout 122, in known systems involving processing of electronic payments, the originator 110 may attempt to send payment 104 despite the fact that a customer account number does not pass a check digit routine 124. In such a case, payment 104 cannot be processed, and a direct mail check may be required.

A particular biller 106 may additionally require account transaction rules 126 to be satisfied. Account transaction rules 126 may require that a particular payment 108 not exceed or fall below a certain monetary value. In the example, XYZ account transaction rules 126 requires that payment 108 not fall below $5 and not exceed $200. Such account transaction rules 126 may be beneficial to ensure no accidental overpayment or underpayment. In the example, payment 108 has a transaction value of $250 (listed in Table 1) and XYZ account transaction rule 126 is not satisfied. In known systems involving processing of electronic payments, the originator 110 may attempt to send payment 104 although XYZ account transaction rules 126 are unsatisfied. Because of the transaction value of electronic payment 108, payment 104 cannot be processed, and a direct mail check may be required.

A particular biller 106 may further require that all originators 110 fall into a matching business category as biller 106. Such categories may be referred to as "lines-of-business". This may be valuable when multiple originators 110 exist and it is beneficial to have particular relationships between particular originators 110 and particular billers 106. For example, biller 106 is associated with XYZ account line-of-business 128. Biller/payee identification number "1234" (listed in Table 1) accordingly maps directly to XYZ account line-of-business 128. XYZ account line-of-business 128 has a value of "utility" because biller/payee 106 is an electric company. Originator 110 is associated with originator line-of-business 112. Billing payment originator number "1234567890" (listed in Table 1) accordingly maps directly to originator line-of-business 112. In the example, if originator line-of-business 112 has a value of "financial services", then originator 110 does not match the business category of biller 106. In known systems involving processing of electronic payments, the originator 110 may attempt to send payment 104 although the business categories of biller 106 and originator 110 do not match. Because of the mismatched business categories, payment 104 cannot be processed, and a direct mail check may be required.

A particular biller 106 may additionally identify certain customer account numbers as not qualified for submitting payments 104 using a bill payment originator 110. Biller 106 may identify these customer account numbers as unqualified because the customer account requires special handling. For example, biller 106 may not want to process certain customer account numbers associated with accounts that have gone into collections or accounts that have closed. The customer account numbers may otherwise follow account layout 122, pass check digit routine 124, be associated with an electronic payment 108 which satisfies transaction rules 126, and account line-of-business 128 may correspond to originator line-of business 112. However, biller/payee 106 may still not process payment 104 because the customer account number is identified in an account stop file service 129. In the example, the customer account number (listed in Table 1 as "1-2-333-4444") may be identified as a customer account number which cannot send payments 104 to be processed by biller 106.

In known systems involving processing of electronic payments, the originator 110 may attempt to send payment 104 although XYZ account stop file service 129 identifies the customer account number as being unable to be processed. Because of account stop file service 129 identifying the customer account number, payment 104 cannot be processed.

Figure 2:
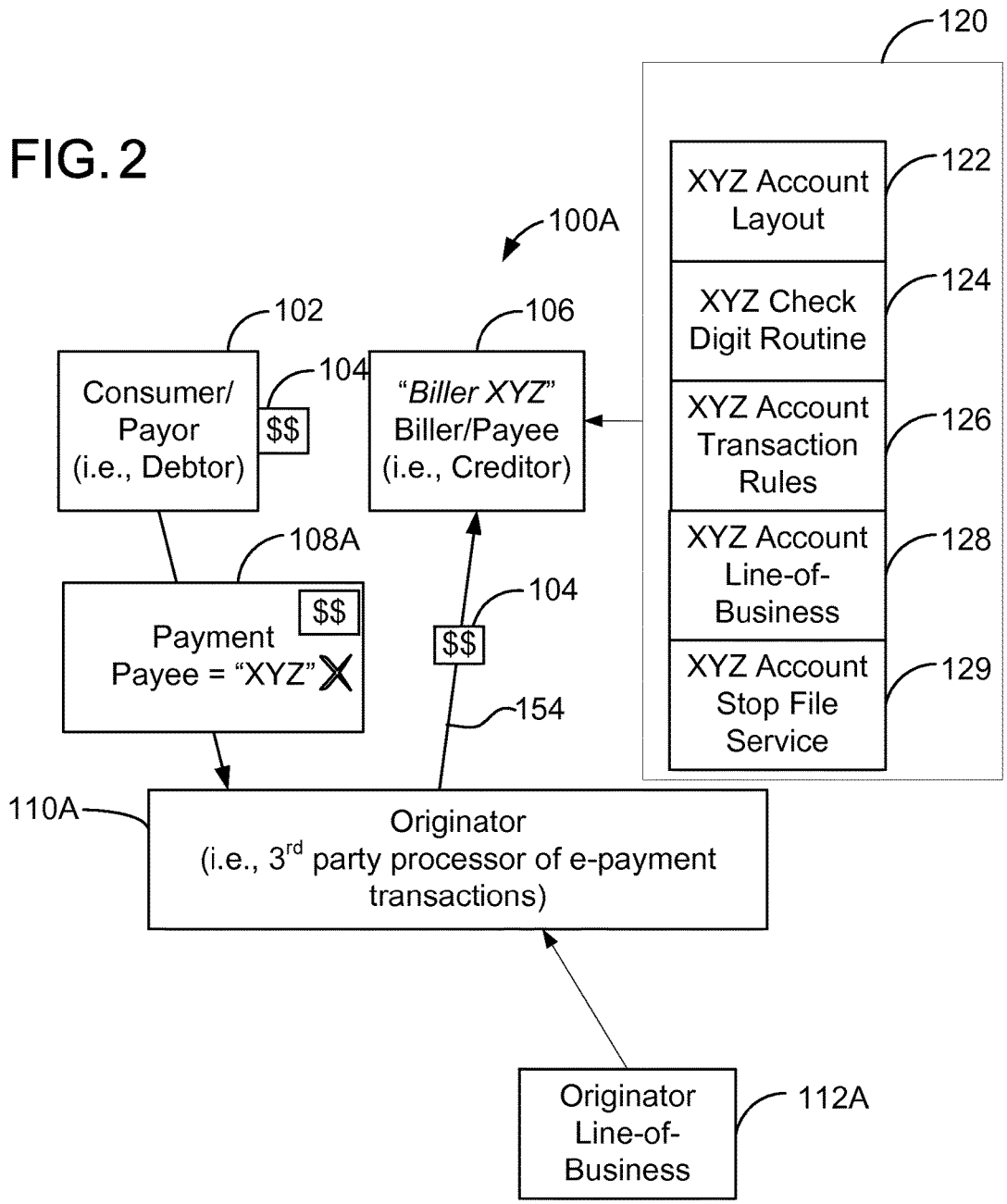

FIG. 2 illustrates an example payment system 100B for processing electronic payments without the customer account validation processor wherein a payment initiated by a payor is successfully processed by a biller. As in FIG. 1, payor 102 (i.e., a debtor) owes a payment 104 to a biller 106. Payor 102 is a resident of a municipality that owes a payment 104 for residential electricity to a biller 106, the local electric company "Biller XYZ." Payor 102 utilizes online payment of bills through an originator 110A. Note that originator 110A is distinct from originator 110. Originator 110A is associated with originator line-of-business 112A. In this example, payor 102 includes in electronic payment 108A the following information:

TABLE 2

| | |
|---|---|
| Billing Payment Originator Number | 9876543210 |
| Date/Time Stamp | Jan. 1, 2013 1:15 AM |
| Biller/Payee Identification Number | 1234 |
| Customer Account Number | 1-22-333-4444 |
| Transaction Amount | $100.00 |
| Customer Identifier | 1234 Anywhere Drive Smalltown, BB |

In this example, the customer account number of electronic payment 108A satisfies XYZ account layout 122 because it follows the format "#-##-###-####." Electronic payment 108 further satisfies XYZ check digit routine 124. Electronic payment 108A additionally has a transaction amount of $100.00 which satisfies XYZ transaction rules 126 by falling between $5 and $200. Electronic payment 108A additionally is associated with originator 110A with billing payment originator number "9876543210" which is associated with originator line-of-business 112A. Originator line-of-business 112A is "utility." As a result, electronic payment 108A satisfies all of the validation rules 120 associated with biller/payee 106. In known systems involving processing of electronic payments, the originator 110 may attempt to send payment 104 with manual validation of validation rules 120 or no validation. In this example, payment 104 will be successfully processed.

Figure 3:
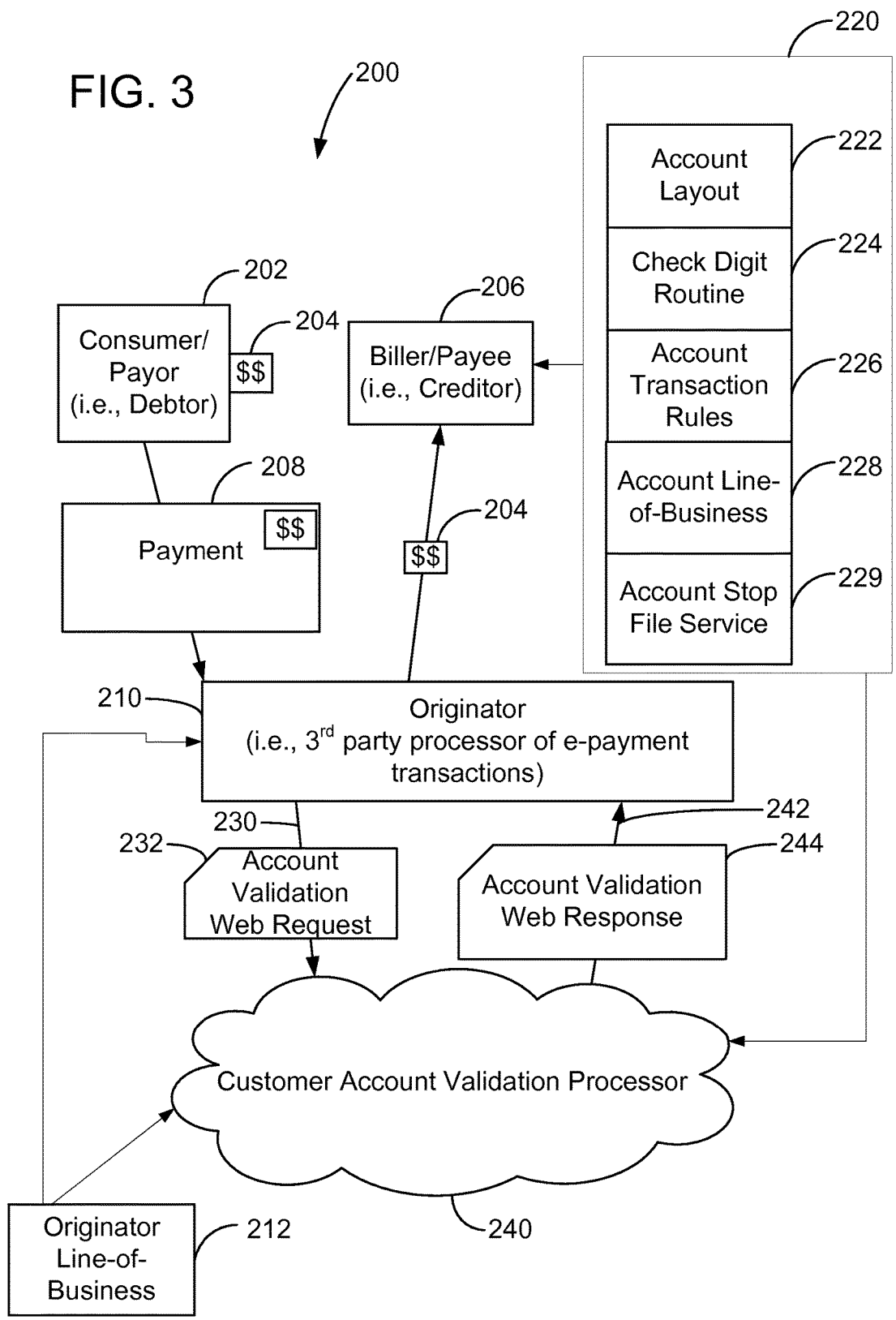

FIG. 3 illustrates an example payment system 200 for processing electronic payments using a customer account validation processor 240 in accordance with the present disclosure. As in FIG. 1 and FIG. 2, payor 202 owes a payment 204 to a biller 206. Payor 202 is a resident of a municipality that owes a payment 204 for cable television to a biller 206, the local cable company "Biller ABC." Payor 202 utilizes online payment of bills through an originator 210. Originator 210 is associated with originator line-of-business 212.

To facilitate reduced rates of error and/or manual processing in billing, originator 210 may utilize a customer account validation processor 240. Customer account validation processor 240 substantially represents a host including a processor and a memory device (not shown in FIG. 3) used to validate electronic payment 208. Originator 210 receives electronic payment 208 from payor 202. Electronic payment 208 may be in any form including check or cash. A user associated with originator 210 (e.g., a clerk) uses a computing device (not shown in FIG. 3) to transmit 230 an account validation web request 232. Account validation web request 232 represents the clerk using an application (e.g., a web application or a desktop application) on a customer service computer station to access customer account validation processor 240. Account validation web request 232 further represents the application transmitting 230 an HTTP request, sent to a gateway, to use a web service hosted on a host (not shown in FIG. 3). Information contained in account validation web request 232 includes a billing payment originator identifier, a date and time associated with the account validation web request 232, a biller identifier, and a customer account number. Account validation web request 232 may also include a transaction amount (i.e., the value associated with the payment) and a plurality of customer identifiers. The plurality of customer identifiers may include a variety of identifying information for the customer including customer categories, affiliations, and location information.

Due to potential security concerns, account validation web request 232 may be transmitted 230 using a security method. For example, account validation web request 232 may involve the use of digital signatures, virtual security keys, and secure transmission protocols. Account validation web request 232 is received by a web service running on the host (not shown in FIG. 3). In the example embodiment, the web service is a web application programming interface where account validation web request 232 can be received as a hypertext transfer protocol request. In this example, account validation web request 232 represents a HTTP request sent to a gateway which can identify the web service used for validation. Account validation web request 232 substantially represents a URL request which may be sent to the web service and include references to information related to the account validation. The HTTP request further includes a reference to the specific web service which can be parsed from the URL. The gateway parses this reference and passes the request to the appropriate validation web service.

Customer account validation processor 240 processes account validation web request 232 to parse out account details. The account details are, as described above, the components of the account validation web request 232 and include at least a billing payment originator identifier, a date and time associated with the account validation web request, a biller identifier, and a customer account number. The account details may also include a transaction amount and the plurality of customer identifiers.

Customer account validation processor 240 accesses validation rules 220 to determine whether electronic payment 208 is valid. Accessing validation rules 220 substantially represents customer account validation processor 240 retrieving validation rules 220 from at least one database (not shown in FIG. 3). For example, customer account validation processor 240 may compare account layout 222 (or account mask) to the customer account number used in electronic payment 208. Customer account validation processor 240 retrieves account layout 222 from validation rules 220 at the at least one database and verify that the format of the customer account number matches this format.

Customer account validation processor 240 may also validate customer account number using check digit routine 224. Customer account validation processor 240 retrieves check digit routine 224 from validation rules 220 at the at least one database and run the algorithm or algorithms represented using the customer account number.

Customer account validation processor 240 may validate electronic payment 208 using account transaction rules. Customer account validation processor 240 retrieves account transaction rules 226 from validation rules 220 at the at least one database and verify that the transaction value associated with electronic payment 208 is, for example, within the range permitted by account transaction rules 226.

Customer account validation processor 240 may also validate that electronic payment 208 properly ensures that biller/payee 206 and originator 210 are from the same line-of-business. Customer account validation processor 240 retrieves account line-of-business 228 associated with biller/payee 206 from validation rules 220 at the at least one database. Customer account validation processor compares account line-of-business 228 to originator line-of-business 212 and ensures that the lines of business match one another.

Customer account validation processor 240 may additionally validate that electronic payment 208 is associated with a customer account number which is not included within account stop file service 229. Customer account validation processor 240 retrieves account stop file service 229 from validation rules 220 at the at least one database to determine if biller/payee 206 utilizes account stop file service 229 based on an indicator in account stop file service 229. If biller/payee 206 is determined to use account stop file service 229, customer account validation processor 240 retrieves a table from account stop file service 229 listing all customer account numbers which cannot be processed. Customer account validation processor 240 compares the customer account number to the account numbers listed in account stop file service 229. If the customer account number is listed, customer account validation processor 240 notes that electronic payment 208 should be rejected for failing to satisfy account stop file service 229.

Customer account validation processor 240 also transmits 242 account validation web response 244 to originator 210. Account validation web response 244 represents a response message indicating whether electronic payment 208 is valid to originator 210. Account validation web response 244 includes a response indicator representing whether electronic payment 208 was validated generally. In the example embodiment, account validation web response 244 includes a flag indicating that electronic payment 208 is "Valid" or "Invalid." Account validation web response 244 further may include an error message and an error code. For example, if the check digit routine fails to validate, an error message may be sent in account validation web response 244 with the message "Check Digit Fail" and the error code "CDF". Account validation web response 244 is sent as a HTTP response sent by a web service on the host running customer account validation processor 240.

Figure 4:
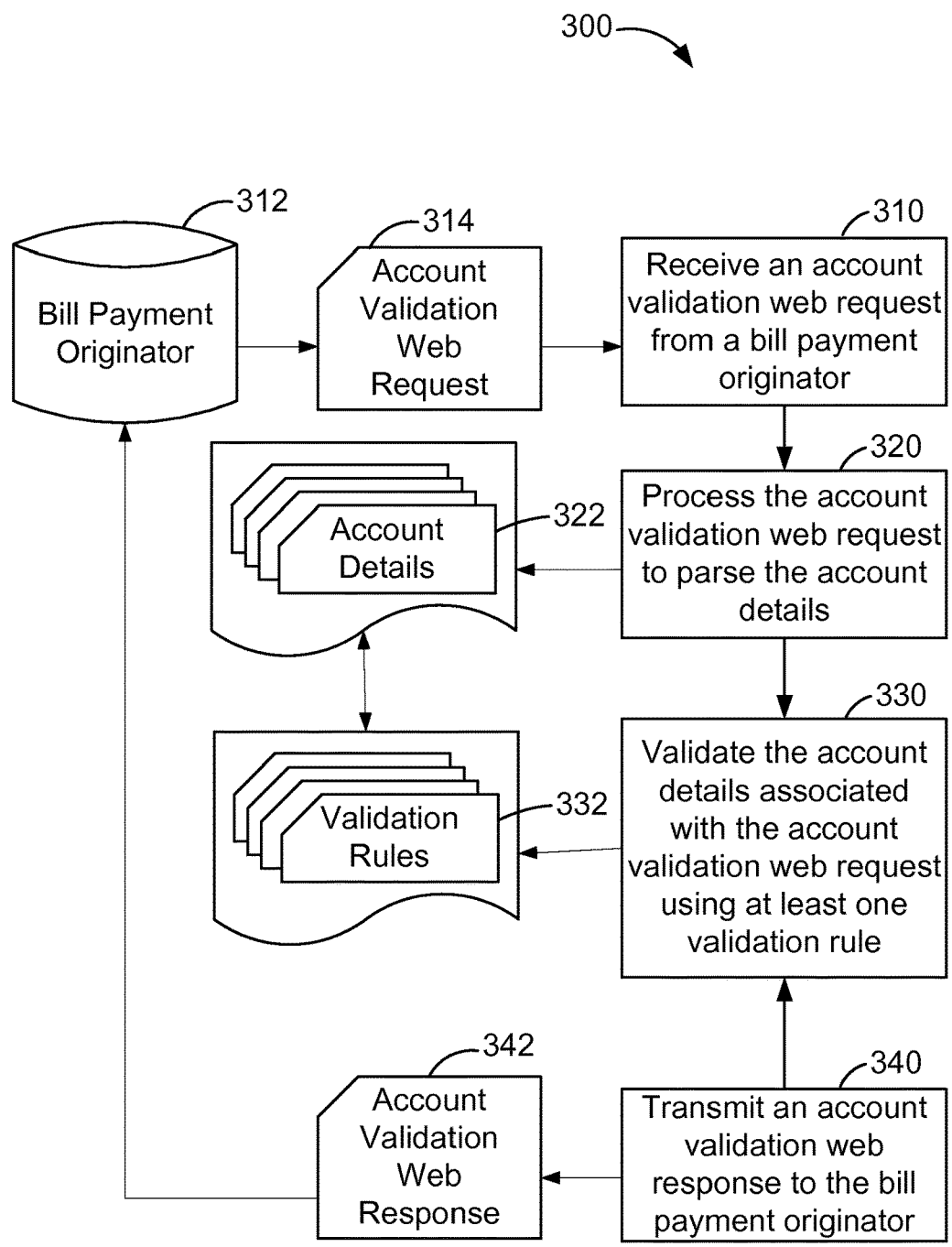

FIG. 4 is a flow diagram of an example validation method 300 performed by customer account validation processor 240 (shown in FIG. 3). Customer account validation processor 240 (shown in FIG. 3) initially receives 310 an account validation web request from a bill payment originator. Receiving 310 represents receiving account validation web request 314 from bill payment originator 312. Customer account validation processor 240 receives account validation web request 314 as an HTTP request from a computing device associated with bill payment originator 312.

Customer account validation processor 240 processes 320 the account validation web request to parse the account details. Processing 320 represents determining account details 322 associated with the electronic payment 208 (shown in FIG. 3) submitted by payor 202 (shown in FIG. 3) to bill payment originator 312. Account details 322 represent at least a billing payment originator identifier, a date and time associated with the account validation web request, a biller identifier, and a customer account number. Account details 322 may also include a transaction amount and the plurality of customer identifiers.

Customer account validation processor 240 validates 330 account details associated with the account validation web request using at least one validation rule. Customer account validation processor 240 validates by retrieving validation rules 332 including at least one of account layout 222, check digit routine 224, account transaction rules 226, and account line-of-business 228 (shown in FIG. 3). In at least some examples, validation rules 332 may vary for each transaction depending upon, variously, biller/payee 206, originator 210, and consumer/payor 202. Validation rules 332 are compared to account details 322 to validate 330.

Customer account validation processor 240 transmits 340 an account validation web response to the bill payment originator. Transmitting 340 represents sending an account validation web response 342 to bill payment originator 312. Account validation web response 342 indicates whether electronic payment 208 is valid. Account validation web response 342 includes a response indicator representing whether electronic payment 208 was validated generally and may further include an error message and an error code.

Figure 5:
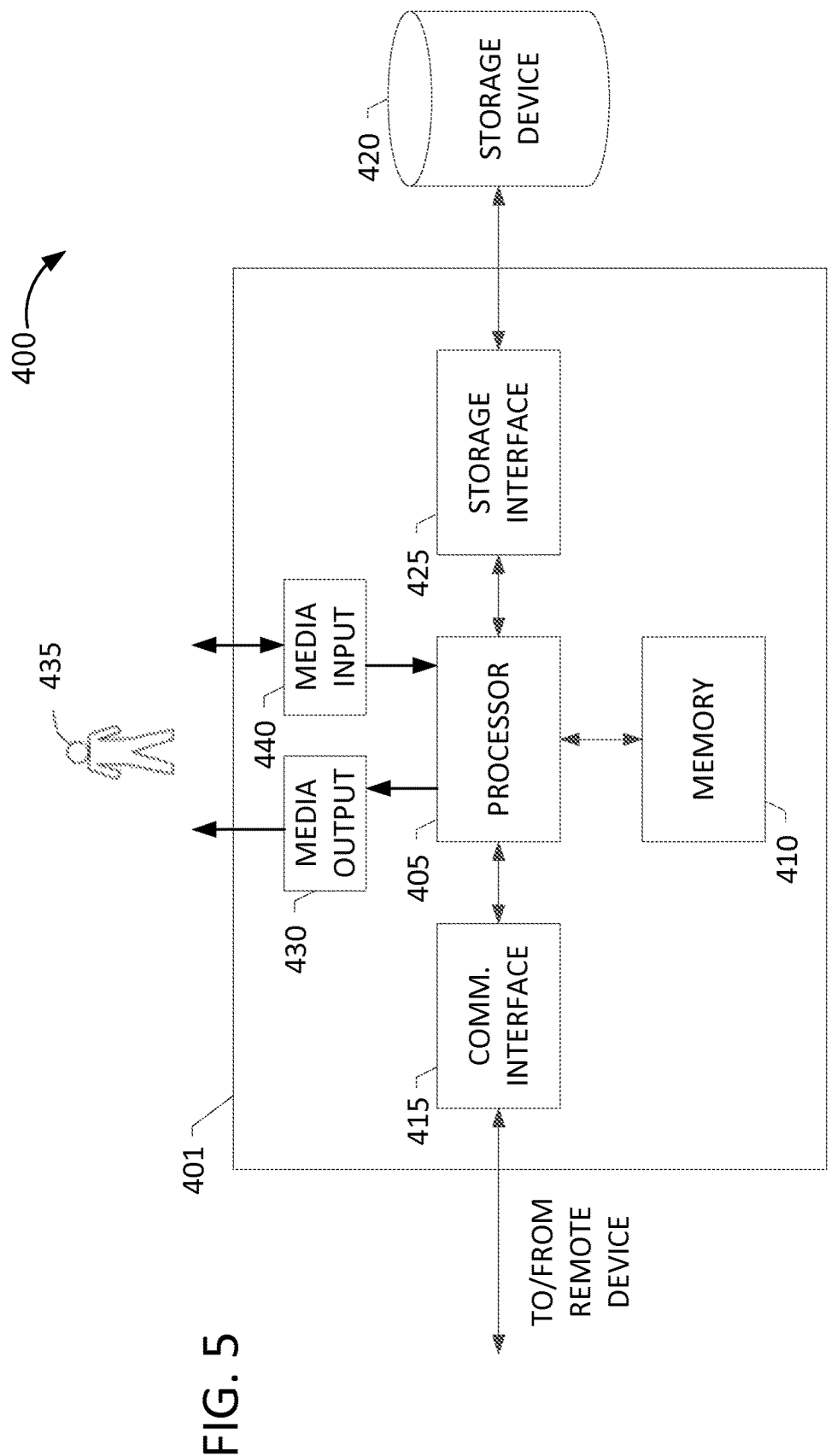

FIG. 5 illustrates an example configuration of host computing device 401 that may be used with payment system 200 (shown in FIG. 3) as customer account validation processor 240 (shown in FIG. 3). Host computing device 401 may be a server system. Host computing device 401 includes a processor 405 for executing instructions. Instructions may be stored in a memory area 410, for example. Processor 405 may include one or more processing units (e.g., in a multi-core configuration) for executing instructions. The instructions may be executed within a variety of different operating systems on the host computing device 401, such as UNIX®, LINUX®, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 405 is operatively coupled to a communication interface 415 such that host computing device 401 is capable of communicating with a remote device such as a user system or another host computing device 401. Communication interface 415 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX). For example, communication interface 415 may communicatively couple with originator 210 (shown in FIG. 3) via the Internet, or any other network.

Processor 405 may also be operatively coupled to a storage device 420. Storage device 420 is any computer-operated hardware suitable for storing and/or retrieving data. In some embodiments, storage device 420 is integrated in host computing device 401. For example, host computing device 401 may include one or more hard disk drives as storage device 420. In other embodiments, storage device 420 is external to host computing device 401 and may be accessed by a plurality of host computing devices 401. For example, storage device 420 may include multiple storage units such as hard disks or solid state disks in a redundant array of inexpensive disks (RAID) configuration. Storage device 420 may include a storage area network (SAN) and/or a network attached storage (NAS) system.

In some embodiments, processor 405 is operatively coupled to storage device 420 via a storage interface 425. Storage interface 425 is any component capable of providing processor 405 with access to storage device 420. Storage interface 425 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 420.

Host computing device 401 may also include at least one media output component 430 for presenting information to a user 435. Media output component 430 is any component capable of conveying information to user 435. In some embodiments, media output component 430 includes an output adapter such as a video adapter and/or an audio adapter. An output adapter is operatively coupled to processor 405 and operatively couplable to an output device such as a display device, a liquid crystal display (LCD), organic light emitting diode (OLED) display, or "electronic ink" display, or an audio output device, a speaker or headphones.

In some embodiments, host computing device 401 includes an input device 440 for receiving input from user 435. Input device 440 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 430 and input device 440.

Memory area 410 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Stored in memory area 410 are, for example, computer readable instructions for providing a user interface to user 435 via media output component 430 and, optionally, receiving and processing input from input device 440. A user interface may include, among other possibilities, a web browser and client application. Web browsers enable users, such as user 435, to display and interact with media and other information typically embedded on a web page or a website from host computing device 401. A client application allows user 435 to interact with a server application from host computing device 401.

Figure 6:
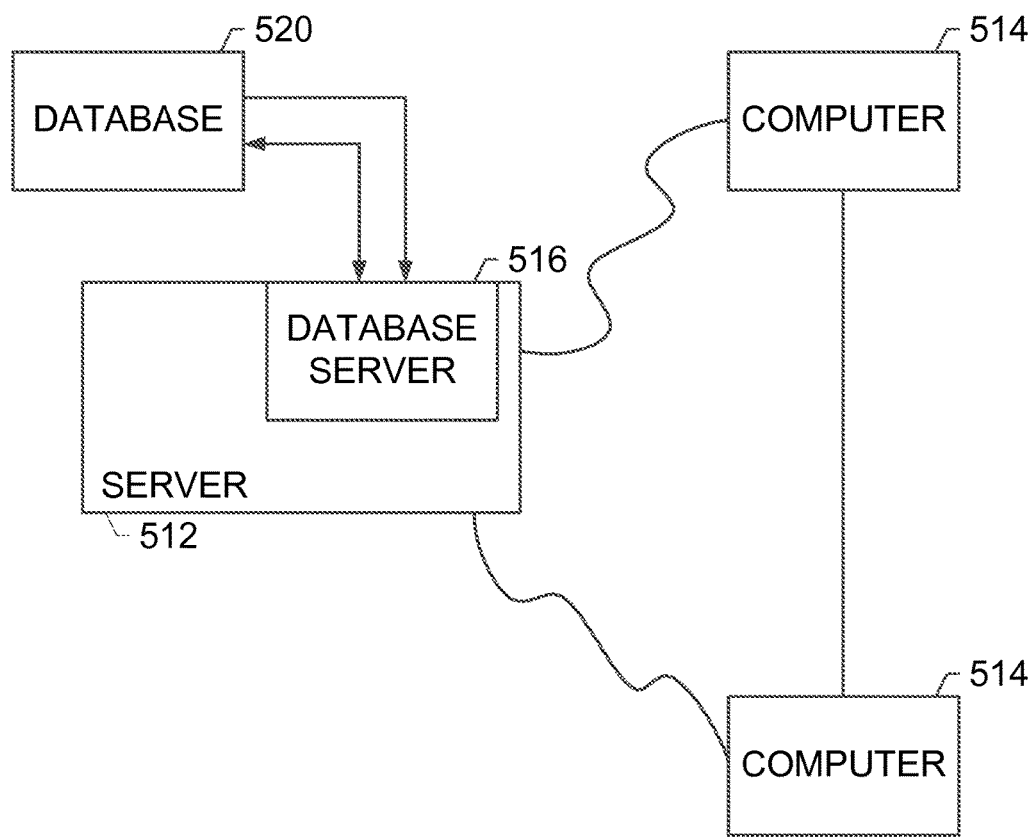

FIG. 6 is a simplified block diagram of an example system 500 for use with system 200 shown in FIG. 3. In one embodiment, system 500 is similar to customer account validation processor 240 (shown in FIG. 3). More specifically, in the example embodiment, system 500 includes a server system 512, and a plurality of client sub-systems, also referred to as client systems 514, connected to server system 512. System 500 is sometimes referred to as the RPPS® (Remote Payment and Presentment Service) system or the payment system. (RPPS is a registered trademark of MasterCard International Incorporated.) In one embodiment, client systems 514 are computers including a web browser, such that server system 512 is accessible to client systems 514 using the Internet. Client systems 514 are interconnected to the Internet through many interfaces including a network, such as a local area network (LAN) or a wide area network (WAN), dial-in-connections, cable modems and special high-speed ISDN lines. Client systems 514 could be any device capable of interconnecting to the Internet including a web-based phone, personal digital assistant (PDA), or other web-based connectable equipment. A database server 516 is connected to a database 520 containing information on a variety of matters, as described below in greater detail. In one embodiment, centralized database 520 is stored on server system 512 and can be accessed by potential users at one of client systems 514 by logging onto server system 512 through one of client systems 514. In an alternative embodiment, database 520 is stored remotely from server system 512 and may be non-centralized.

As discussed within, a biller directory, e.g., biller database, and/or other consumer related data including data utilized and processed by the billers can be stored within database 520. For example, the biller directory may include a list of billers registered to receive payments electronically, a format or structure of consumer account related information that is acceptable for each biller (also referred to herein as an account mask or billing account structure) for processing payments electronically, exception masks associated with the registered billers if required by the particular biller, a list of consumer accounts that are registered for electronic processing of payments, and other consumer related information such as names of the consumers, addresses and telephone numbers, other consumer identifiers, account numbers and payment histories. Other data may also be stored within database 520 including originator database and/or exception payment batch files. In addition, similar data or other billing and consumer related data may also be stored within other databases such as a database associated with billers and/or a database associated with originators.

Figure 7:
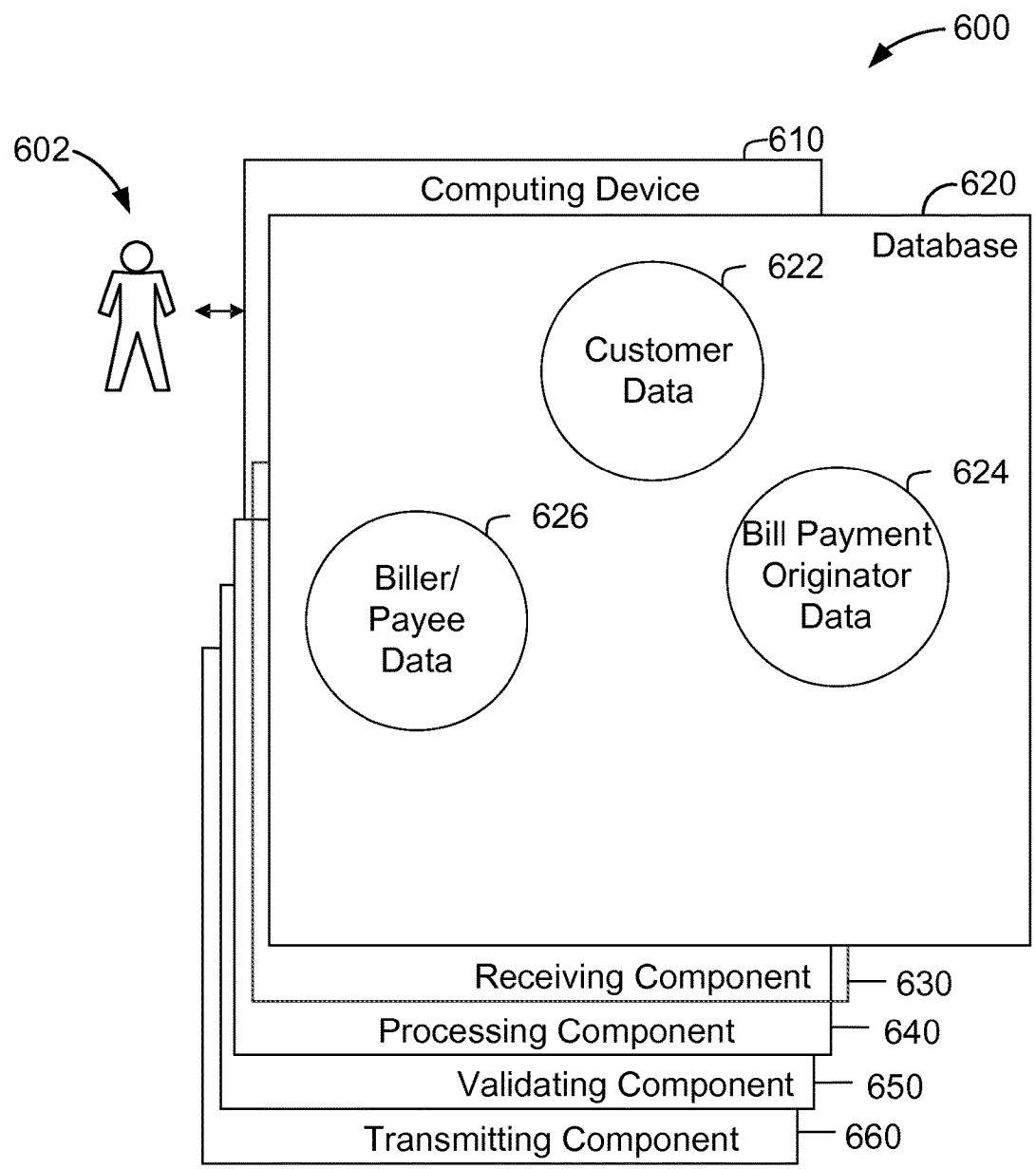

FIG. 7 shows an example configuration 600 of a database 620 within a computing device 610, along with other related computing components, that may be used during the account validation process. Database 620 is coupled to several separate components within computing device 610, which perform specific tasks.

In the example embodiment, database 620 includes customer data 622, bill payment originator data 624, and biller/payee 626. Customer data 622 includes customer transaction information, such as, for example, a customer identifier, transaction amount, transaction date/time, and transaction history. Bill payment originator data 624 includes information on the known list of bill payment originators, such as, for example, an originator account identifier, line-of-business, and contact information. Biller/payee data 626 includes information related to the biller/payee including contact information, account identifiers, account masks, check digit routines, transaction rules, and line-of-business.

Computing device 610 includes the database 620 as well as a receiving component 630 for receiving inbound information from an originator 210 (shown in FIG. 3) into the database 620. Computing device 610 also includes a processing component 640 for processing account details from account validation web request 314 (shown in FIG. 4). Validating component 650 is also included for validating account details using at least one validation rule retrieved from biller/payee data 626. Further, computing device 610 includes a transmitting component 660 for communicating results back to originator 210.

The embodiments illustrated and described herein as well as embodiments not specifically described herein but within the scope of aspects of the disclosure constitute exemplary means for the electronic processing of financial transactions, and more particularly, constitute exemplary means for the electronic processing of financial transactions having a payment included therewith in order to affect payment of a bill. For example, the server system 512 or the client system 514, or any other similar computer device, programmed with computer-executable instructions illustrated in FIG. 6 constitutes exemplary means for the electronic processing of financial transactions having an exception payment included therewith in order to affect payment of a bill.

As used herein, an originator includes any entity providing a consumer with a service to facilitate on-line bill payment. For example, an originator may include a financial institution such as a bank or a third-party entity used by a bank for processing on-line payments for consumers. An originator may also include or be referred to as a consumer service provider (CSP). A biller is typically a merchant or an entity that provides a good or service to a consumer. A biller service provider is an entity that provides a biller with a service to allow the biller to receive bill payments. In some cases, a biller can also serve as a biller service provider for themselves or other billers. Accordingly, as used herein, in at least some cases the biller and the biller service provider can be the same entity.

In an alternative embodiment, some or all of the tasks described above as being performed by the originator, the biller service provider and/or the biller are performed by payment system 500. For example, in an alternative embodiment, the originators and billers opting to use the payment system (i.e., sending and receiving exception payments electronically) are stored within the payment system.

In at least some known electronic bill payment systems, payments are originated by a bill payment service provider, which is also known as an originator. These payments may be fulfilled either via an electronic transaction or via a paper check. The determination of whether a bill payment is fulfilled electronically or via check is based on the data the consumer enters for the payment. If the data entered matches billing data (account masks, remittance address, check digit routine, etc.) provided by a biller or payor, and are reflected on a biller directory provided to the bill payment service provider, then the payment can be fulfilled electronically by the bill payment service provider (originator). If the data entered by the consumer does not match the billing data provided by the biller and stored on the biller directory, an originator creates a paper check containing the consumer entered data for the payment method. The paper check is provided to the biller or the biller's service provider.

The systems and processes are not limited to the specific embodiments described herein. In addition, components of each system and each process can be practiced independent and separate from other components and processes described herein. Each component and process also can be used in combination with other assembly packages and processes.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is receiving a payee input file, determining whether each payee in the payee input file matches a biller in a biller database, and outputting an output file that indicates whether each payee was matched to a biller. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer system for validating an account validation web request associated with a customer account before the customer account is used to make an electronic payment to pay a bill over a bill payment network, the bill payment network including a bill payment originator in communication with a plurality of billers, said computer system comprising a host computing device in communication with the bill payment originator over an account validation network, said host computing device having a processor in communication with a memory device, said host computing device programmed to:

store within the memory device a plurality of validation rules associated with the plurality of billers, the plurality of validation rules configured to verify the account validation web request associated with the customer account before the customer account is used to electronically pay a bill over the bill payment network, wherein the account validation web request is associated with the electronic payment;

execute, at the host computing device, a plurality of web services configured to receive the account validation web request and to validate account details associated with the account validation web request using the plurality of validation rules;

receive, at the host computing device, the account validation web request from the bill payment originator over the account validation network, wherein the account validation web request includes the account details and a uniform resource locator (URL), wherein the URL includes a web service reference for identifying a specific web service of the plurality of web services, wherein the bill payment originator is associated with a user who receives at least one of a check payment and a cash payment from a payor, wherein the payor is associated with the customer account, and wherein the electronic payment is based on at least one of the check payment and the cash payment;

transmit the account validation web request to a gateway;

parse, by the gateway, the web service reference from the URL to identify the specific web service of the plurality of web services from the web service reference;

pass, by the gateway, the account validation web request to the specific web service, wherein the specific web service is configured to parse the account details from the account validation web request;

retrieve a set of validation rules from the plurality of validation rules;

compare the account details associated with the account validation web request to the set of validation rules, wherein the set of validation rules includes (i) a check digit routine for verifying a consumer account number included within the account details, (ii) a biller account mask comparison for verifying a biller account number included within the account details, (iii) a stop file service for verifying that the consumer account number is not included in a list of stop file service consumer account numbers, and (iv) a line-of-business category comparison for verifying an originator line-of-business category associated with the bill payment originator, wherein the set of validation rules is associated with a biller of the plurality of billers corresponding to the specific web service, and wherein the line-of-business category comparison verifies that the originator line-of-business category matches an account line-of-business category associated with the biller; and if, based upon the comparison, the account details and the set of validation rules match, then transmit an account validation web response to the bill payment originator, the account validation web response including validation of the account details and instructing the bill payment originator to transmit the electronic payment to the bill payment network for payment processing.

2. The computer system of claim 1, said host computing device further programmed to:

receive the account validation web request after applying at least one security application.

3. The computer system of claim 1, said host computing device further programmed to:

receive the account validation web request from at least one originator computing device in communication with the host computing device, wherein the account details include at least one of:

a bill payment originator identification associated with the account validation web request and the bill payment originator;

a timestamp identifier associated with the account validation web request wherein the timestamp identifier substantially represents a date and time associated with the account validation web request;

a biller identification number associated with the account validation web request and the biller;

a consumer account number associated with the account validation web request;

a transaction value associated with the account validation web request; and at least one consumer identifier.

4. The computer system of claim 1, said host computing device further programmed to:

retrieve, from a biller database, at least one biller account layout associated with the biller associated with the account validation web request.

5. The computer system of claim 1, said host computing device further programmed to:

retrieve, from a biller database, the set of validation rules including at least one of a check digit routine and a biller account mask comparison associated with a biller associated with the account validation web request.

6. The computer system of claim 1, wherein the check digit routine includes performing a checksum operation using a Luhn algorithm, and wherein the biller account mask comparison includes applying an account mask comprising a regular expression corresponding to an expected string format.

7. The computer system of claim 3, said host computing device further programmed to:
  validate the account details by verifying that the transaction value associated with the account validation web request does not exceed a threshold transaction value amount.

8. The computer system of claim 3, said host computing device further programmed to:
  determine that the biller identification number is associated with the stop file service;
  retrieve the list of stop file service consumer account numbers; and
  validate the account details by determining that the consumer account number is not included within the list of stop file service consumer account numbers.

9. The computer system of claim 3, wherein the account validation web response includes the at least one consumer identifier.

10. The computer system of claim 1, wherein the account validation web response includes a response indicator representing whether the account details were validated.

11. The computer system of claim 1, wherein the account validation web response includes at least one of an error message and an error code.

12. A computer-based method for validating an account validation web request associated with a customer account before the customer account is used to make an electronic payment to pay a bill over a bill payment network, the bill payment network including a bill payment originator in communication with a plurality of billers, using a host computing device in communication with the bill payment originator over an account validation network, said host computing device including a processor in communication with a memory device, said method comprising:
  storing, within the memory device, a plurality of validation rules from a plurality of billers, the plurality of validation rules configured to verify the account validation web request associated with the customer account before the customer account is used to electronically pay a bill over the bill payment network, wherein the account validation web request is associated with the electronic payment;
  executing, at the host computing device, a plurality of web services configured to receive account validation web request and to validate account details associated with account validation web request using the plurality of validation rules, wherein each of the plurality of web services is associated with a biller payment system;
  receiving, at the host computing device, the account validation web request from the bill payment originator over the account validation network, wherein the account validation web request includes account details and a uniform resource locator (URL), wherein the URL includes a web service reference for identifying a specific web service of the plurality of web services, wherein the bill payment originator is associated with a user who receives at least one of a check payment and a cash payment from a payor, wherein the payor is associated with the customer account, and wherein the electronic payment is based at least one of the check payment and the cash payment;
  transmitting the account validation web request to a gateway;
  parsing, by the gateway, the web service reference from the URL to identify the specific web service of the plurality of web services from the web service reference;
  passing, by the gateway, the account validation web request to the specific web service, wherein the specific web service is configured to parse the account details from the account validation web request;
  retrieving a set of validation rules from the plurality of validation rules;
  comparing the account details associated with the account validation web request the set of validation rules, wherein the set of validation rules includes (i) a check digit routine for verifying a consumer account number included within the account details, (ii) a biller account mask comparison for verifying a biller account number included within the account details, (iii) a stop file service for verifying that the consumer account number is not included in a list of stop file service consumer account numbers, and (iv) a line-of-business category comparison for verifying an originator line-of-business category associated with the bill payment originator, wherein the set of validation rules is associated with a biller of the plurality of billers corresponding to the specific web service, and wherein the line-of-business category comparison verifies that the originator line-of-business category matches an account line-of-business category associated with the biller; and
  if, based upon the comparison, the account details and the set of validation rules match, then transmitting an account validation web response to the bill payment originator, the account validation web response including validation of the account details and instructing the bill payment originator to transmit the electronic payment to the bill payment network for payment processing.

13. The method of claim 12, further comprising receiving the account validation web request after applying at least one security application.

14. The method of claim 12, further comprising receiving the account validation web request from at least one originator computing device, wherein the account details include at least one of:
  a bill payment originator identification associated with the account validation web request and the bill payment originator;
  a timestamp identifier associated with the account validation web request wherein the timestamp identifier substantially represents a date and time associated with the account validation web request;
  a biller identification number associated with the account validation web request and the biller;
  a consumer account number associated with the account validation web request;
  a transaction value associated with the account validation web request; and
  at least one consumer identifier.

15. The method of claim 12, further comprising:
  retrieving, from a biller database, at least one biller account layout associated with the biller associated with the account validation web request.

16. The method of claim 12, further comprising:
  retrieving, from a biller database, the set of validation rules including at least one of a check digit routine and a biller account mask comparison associated with a biller associated with the account validation web request.

17. The method of claim 12, wherein the check digit routine includes performing a checksum operation using a Luhn algorithm, and wherein the biller account mask comparison includes applying an account mask comprising a regular expression corresponding to an expected string format.

18. The method of claim 14, further comprising validating the account details by verifying that the transaction value associated with the account validation web request does not exceed a threshold transaction value amount.

19. The method of claim 14, further comprising:
determining that the biller identification number is associated with the stop file service;
retrieving a list of stop file service consumer account numbers; and
validating the account details by determining that the consumer account number is not included within the list of stop file service consumer account numbers.

20. The method of claim 14, wherein the account validation web response includes the at least one consumer identifier.

21. The method of claim 12, wherein the account validation web response includes a response indicator representing whether the account details were validated.

22. The method of claim 12, wherein the account validation web response includes at least one of an error message and an error code.

23. At least one non-transitory computer-readable storage media having computer-executable instructions embodied thereon for validating an account validation web request associated with a customer account before the customer account is used to make an electronic payment to pay a bill over a bill payment network, the bill payment network including a bill payment originator in communication with a plurality of billers, wherein when executed by at least one processor, the processor at a host computing device and in communication with a memory device and the bill payment originator over an account validation network, the computer-executable instructions cause the processor to:
store within the memory device a plurality of validation rules associated with the plurality of billers, the plurality of validation rules configured to verify the account validation web request associated with the customer account before the customer account is used to electronically pay a bill over the bill payment network, wherein the account validation web request is associated with the electronic payment;
execute, at the host computing device, a plurality of web services configured to receive the account validation web request and to validate account details associated with the account validation web request using the plurality of validation rules, wherein each of the plurality of web services is associated with a biller payment system;
receive, at the host computing device, the account validation web request from the bill payment originator over the account validation network, wherein the account validation web request includes account details and a uniform resource locator (URL), wherein the URL includes a web service reference for identifying a specific web service of the plurality of web services, wherein the bill payment originator is associated with a user who receives at least one of a check payment and a cash payment from a payor, wherein the payor is associated with the customer account, and wherein the electronic payment is based at least one of the check payment and the cash payment;
transmit the account validation web request to a gateway;
parse, at the gateway, the web service reference from the URL to identify the specific web service of the plurality of web services from the web service reference;
pass, at the gateway, the account validation web request to the specific web service, wherein the specific web service is configured to parse the account details from the account validation web request;
retrieve a set of validation rules from the plurality of validation rules;
compare the account details associated with the account validation web request to the set of validation rules, wherein the set of validation rules includes (i) a check digit routine for verifying a consumer account number included within the account details, (ii) a biller account mask comparison for verifying a biller account number included within the account details, (iii) a stop file service for verifying that the consumer account number is not included in a list of stop file service consumer account numbers, and (iv) a line-of-business category comparison for verifying an originator line-of-business category associated with the bill payment originator, wherein the set of validation rules is associated with a biller of the plurality of billers corresponding to the specific web service, and wherein the line-of-business category comparison verifies that the originator line-of-business category matches an account line-of-business category associated with the biller; and
if, based upon the comparison, the account details and the set of validation rules match, then transmit an account validation web response to the bill payment originator, the account validation web response including validation of the account details and instructing the bill payment originator to transmit the electronic payment to the bill payment network for payment processing.

* * * * *